(12) United States Patent
Angel et al.

(10) Patent No.: US 8,667,547 B2
(45) Date of Patent: Mar. 4, 2014

(54) METHOD AND SYSTEM FOR EDITING TEXT MESSAGES CONVEYED VIA A CATV INFRASTRUCTURE AT A TV SET-TOP BOX

(75) Inventors: Amir Angel, Tel-Aviv (IL); Gil Rosen, Tel-Aviv (IL)

(73) Assignee: Comverse, Ltd., Tel Aviv (IL)

( * ) Notice: Subject to any disclaimer, the term of this patent is extended or adjusted under 35 U.S.C. 154(b) by 3817 days.

(21) Appl. No.: 10/207,837

(22) Filed: Jul. 31, 2002

(65) Prior Publication Data

US 2004/0025192 A1    Feb. 5, 2004

(51) Int. Cl.
*H04N 7/173*    (2011.01)

(52) U.S. Cl.
USPC ..................................... 725/110; 725/109

(58) Field of Classification Search
USPC ............................................. 725/46, 47
See application file for complete search history.

(56) References Cited

U.S. PATENT DOCUMENTS

| | | | | |
|---|---|---|---|---|
| 5,543,851 A | * | 8/1996 | Chang | 348/468 |
| 5,875,443 A | * | 2/1999 | Nielsen | 707/2 |
| 6,298,158 B1 | | 10/2001 | Egozi et al. | |
| 7,139,031 B1 | * | 11/2006 | Bray | 348/468 |
| 2002/0059603 A1 | * | 5/2002 | Kelts | 725/47 |
| 2006/0224586 A1 | * | 10/2006 | Pickover et al. | 707/6 |

FOREIGN PATENT DOCUMENTS

WO    WO 98/56181 A1    12/1998

* cited by examiner

*Primary Examiner* — Pankaj Kumar
*Assistant Examiner* — Timothy Newlin
(74) *Attorney, Agent, or Firm* — Ohlandt, Greeley, Ruggiero & Perle, L.L.P.

(57) ABSTRACT

A method and system for replacing at least one item in a source string compiled at a TV set-top box for conveying via a TV communication infrastructure. A TV communication gateway receives the source string from the TV set-top box, parses the source string and identifies at least one item that requires replacing. Such item may be incorrectly spelled or the TV communication gateway may run an application that translates the source string to a foreign language. For each item that requires replacing, the TV communication gateway determines at least one replacement item, compiles data which it forwards to the TV set-top box. In the case of a spell-check program, the data may be an XML list including for each incorrectly spelled item a list of alternatives. The list of replacement items relating to the selected item is displayed, allowing a user to select a desired replacement item.

16 Claims, 5 Drawing Sheets

METHOD AND SYSTEM FOR EDITING TEXT MESSAGES CONVEYED VIA A CATV INFRASTRUCTURE AT A TV SET-TOP BOX

FIELD OF THE INVENTION

This invention relates to editing of text messages such as e-mails and SMS (short message service) messages conveyed via a cable television (CATV) infrastructure.

BACKGROUND OF THE INVENTION

The increasing development of communication systems of one form or another and the infrastructure and expense that is required to maintain them has motivated the service providers of those systems to provide various "added value" services. Thus, it is known for cable television (CATV) providers to allow subscribers to send SMS messages via the CATV system. One example is disclosed in WO 9856181 entitled "*System at telecommunications network*" (Tegler et al.) assigned to Telia AB of Sweden and published Dec. 10, 1998. This reference relates to an interactive broadband service such as digital transmission of video channels, specifically using the GSM-system (Global System of Mobile Communication-system). By way of example, there is described a service which requires low capacity in uplink and that utilizes the SMS-function in GSM. Interactive traffic between the transmitting and receiving equipment is managed by an interactive center, which is arranged to execute the desired broadband service. The interactive centre is also coupled to a distributive centre for distribution of the broadband signals on the telecommunications network.

Such an arrangement is typical of known systems that allow a TV set-top box to send SMS messages via the cellular network. Some digital TV operators provide a service, wherein a TV subscriber can send SMS messages via his/her TV set to a mobile subscriber.

This may typically be implemented by communicating with an SMS gateway that receives the SMS messages from the TV subscribers and sends them through the existing Short Messaging Service Center (SMSC) machines on each of the wireless operator's networks. This is similar to the ability to send SMS messages from a PC, by using a web site that offers this kind of service.

Spell-check programs are known in the field of text-processing that are able to highlight misspellings, offer a list of suggested alternatives upon selection of an incorrect word and replace the incorrect word with a selected alternative.

U.S. Pat. No. 6,298,158 (Egozi et al.) issued Oct. 2, 2001 to Babylon, Ltd. and entitled "*Recognition and Translation System and Method*" discloses a method and system of recognition and translation, stored on a digital storage device with an operating system and running computer applications, such as a personal computer. Input by a computer user is recognized and output is transmitted to the user. The system recognizes characters displayed on the output device of the digital storage device, and translates phrases contiguous to and including the phrase upon which the system is activated and translates words from one written phrase set to a second written phrase set. Such a system is particularly adapted to be operated under a Microsoft Windows environment but there is no suggestion to provide such a system for use with a CATV infrastructure. Microsoft is a registered trademark of Microsoft Corporation, Inc., Redmond USA.

It would thus provide an expanded and useful service to allow SMS and other messages to be input to a TV set-top box and to be spell-checked or translated. [The prior art makes no provision for such a service.

SUMMARY OF THE INVENTION

It is an object of the invention to provide a method and system for replacing at least one item in a source string input to a TV set-top box.

This object is realized in accordance with a first aspect of the invention by a method for replacing at least one word in a source string input to a TV set-top box for conveying via a TV communication infrastructure, the method comprising the following operations all carried out by a TV communication gateway:
 (a) receiving the source string from the TV set-top box,
 (b) for each item that requires replacing determining at least one replacement item, and
 (c) forwarding to the TV set-top box data relating to the at least one replacement item.

According to one embodiment of the invention, the TV communication gateway parses the source string to identify at least one item that requires replacing. This obviates the need for this to be done by the TV set-top box, which would require that sufficient processing power and memory be provided in the TV set-top box to effect the required parsing.

According to a second aspect of the invention, there is provided a method for replacing at least one item in a source string input to a TV set-top box for conveying via a TV communication infrastructure, the method comprising the following operations all carried out by the TV set-top box:
 (a) conveying the source string to a TV communication gateway,
 (b) receiving therefrom data relating to at least one item in the source string that is to be replaced, and
 (c) outputting said data.

According to a third aspect of the invention, there is provided a TV communication gateway for replacing at least one item in a source string input to a TV set-top box and received via a TV communication infrastructure, the TV communication gateway including:
 an input port for receiving the source string,
 a memory coupled to the input port for storing the source string,
 a processor coupled to the input port for obtaining at least one item that requires replacing, and, for each item that requires replacing, determining at least one replacement item, and
 an output port coupled to the processor for forwarding to the TV set-top box data relating to the at least one replacement item.

According to yet another aspect, the invention provides a TV set-top box for editing and outputting messages conveyed via a TV communication infrastructure, the TV set-top box comprising:
 a processor configured to display a user interface on a television connected to the set-top box, the user interface being configured to accept a source string, the processor being further configured to obtain a list of at least one replacement item for the source string and, responsive to a command entered via the user interface, replace at least a portion of the source string identified by the command with at least one of the list of at least one replacement item.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF SPECIFIC EMBODIMENTS

The present invention is being described principally according to the embodiment in which text messages are input at the TV set-top box 12 and an application is run by the TV set-top box 12 in conjunction with the CATV gateway 17 for editing such text messages, but the present invention is not limited to this embodiment. The application may be, for example, a translator that translates a source message (constituting a source string) to a specified foreign language. As noted above, U.S. Pat. No. 6,298,158 (Egozi et al.) entitled "*Recognition and Translation System and Method*" discloses a method and system of recognition and translation and its contents are incorporated herein by reference.

Figure 1:
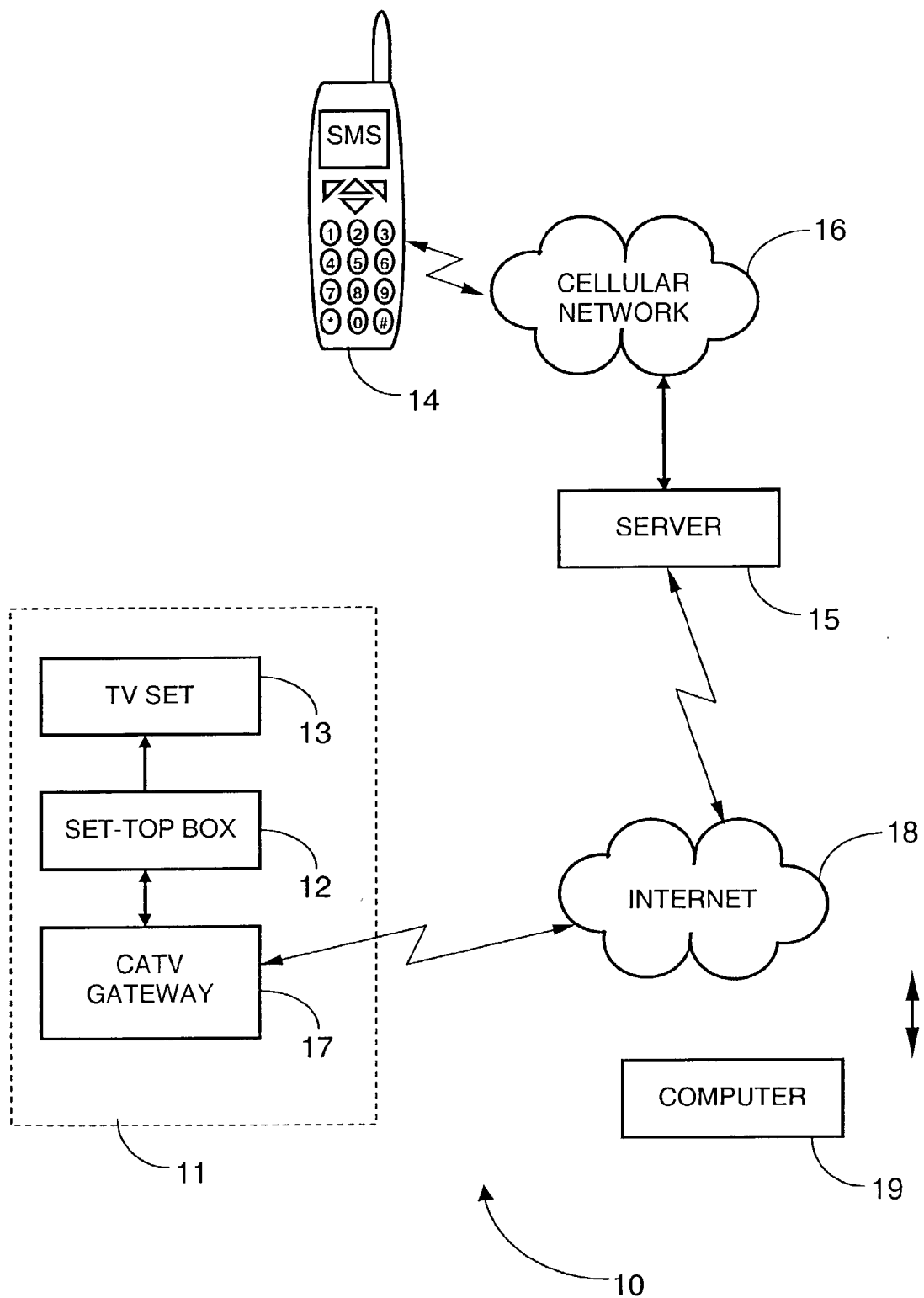
FIG. 1 is a pictorial representation of a system for allowing SMS messages to be conveyed via a CATV infrastructure to a TV set-top box of a destined subscriber.
Figure 2:
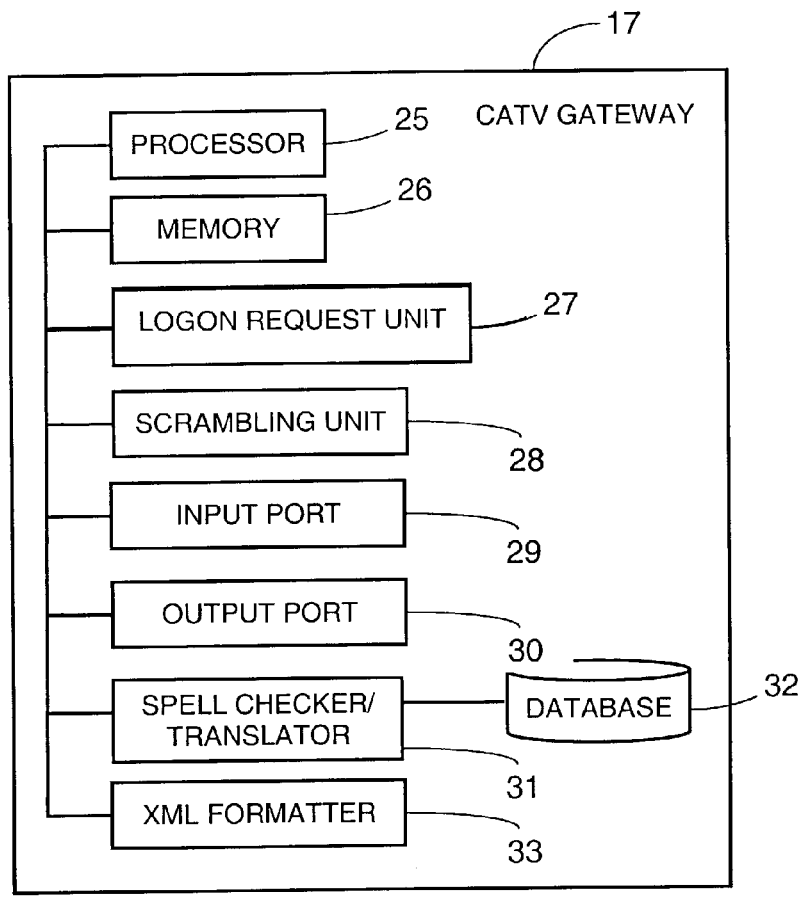
FIG. 2 is a block diagram showing functionally a CATV gateway for use with the system of FIG. 1.

Alternatively, it may be a spell checker that checks the spelling of the text message and suggests alternative words to words that are spelled incorrectly. FIG. 2 is a block diagram showing functionally the CATV gateway 17 including a processor 25 coupled to a memory 26 storing data representative of a text message. A logon request unit 27 is coupled to the processor 25 for processing a logon request received from a TV set-top box and an optional scrambling unit 28 allows a text message received from an external source (such as the cellular telephone 14 or the computer 19) to be scrambled prior to conveying to a TV set-top box. This can be done using the unique address of the TV set-top box, so that only the destined TV set-top box is able to unscramble the received message. An input port 29 and an output port 30 are coupled to the processor 25 for respectively receiving a text message from the server 15 (shown in FIG. 1), and conveying it to a destined TV set-top box via the CATV infrastructure 11 (shown in FIG. 1).

The processor 25 processes an incoming text message received at the input port 29 from a CATV subscriber's TV set-top box 12. An application program such as spell checker or translator 31 is coupled to the processor 25 and operates in association with a database 32. for processing the source string stored in the memory for choosing a replacement string. For example, the database can store a list of words and phrases to allow a spell checker to cross-refer each word in the source string with the database and, for each word not found therein, selects a list of possible alternatives. Typically, the alternatives are phonetically similar to the incorrectly spelled word. It should be noted that preliminary tests may be performed by the spell checker routine to identify errors even before accessing the database 32. By such means, unorthodox combinations of upper and lower case characters may be identified as faulty and suitable alternatives proposed. The suggested alternatives are compiled as a list by an XML formatter 33 coupled to the processor 25. For example, consider a source string reading:

"Dear John, cen we meet in the staf room tomorow?"

This source contains three errors and the XML list will look as follows:

```
<response>
    <word="cen", pos=3>can </word>
    <word="cen", pos=3>cent </word>
    <word="cen", pos=3>ken </word>
    <word="cen", pos=3>can </word>
    <word="staf", pos=8>staff </word>
    <word="staf", pos=8>stave</word>
    <word="staf", pos=8>stag </word>
    <word="staf", pos=8>stab </word>
    <word="staf", pos=8>star </word>
    <word="tomorow", pos=10>tomorrow </word>
</response>
```

The XML list constitutes data relating to at least one replacement word for each misspelled word and is conveyed via the output port 30 of the CATV gateway 17 back to the TV set-top box 12, where an application processes the data to extract therefrom an identity of an incorrectly spelled word in the source string, and displays the identified word using at least one fault attribute, such as different color or underline etc.

The logon request unit 27 processes a logon request sent by a TV set-top box for establishing whether the logon request is valid, i.e. corresponds to a registered subscriber. The logon request identifies the unique address of the sending TV set-top box as well as the ID of the current group member where multiple group members are associated with the identified TV set-top box, each having a separate ID. By such means, the CATV gateway 17 can determine whether a text message stored in the memory 26 belongs to the subscriber currently logged on from the identified TV set-top box 12. If so the text message content stored in the memory 26 is scrambled by the scrambling unit 28 and conveyed to the TV set-top box 12.

Figure 3:
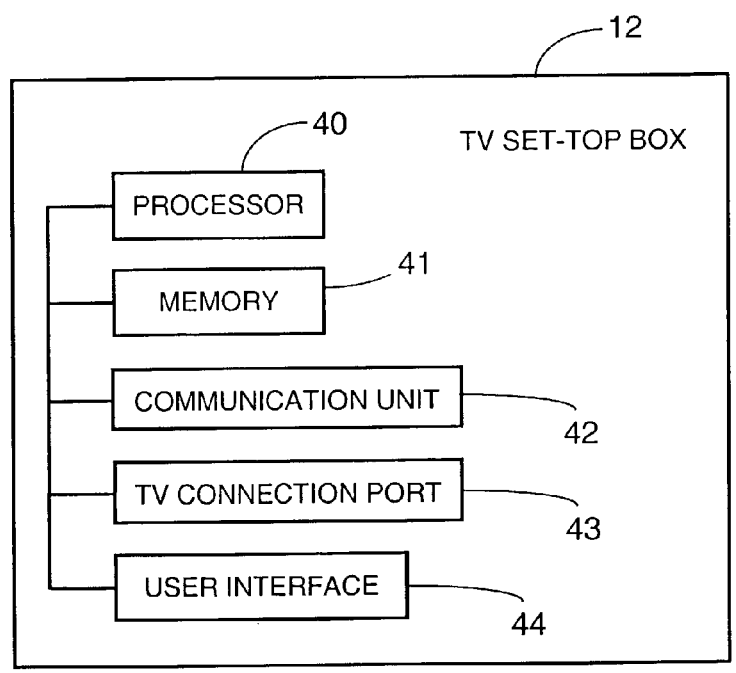
FIG. 3 is a block diagram showing functionally the TV set-top box for use with the system of FIG. 1.

FIG. 3 is a block diagram showing functionally the TV set-top box 12 comprising a processor 40 coupled to a memory 41 and a communication unit 42 for establishing bi-directional communication with the CATV gateway 17 The processor 40 may operate in conjunction with a user interface 44 to run an application stored in the memory 41 for identifying a selected incorrectly spelled word in the source string and cross-referring the selected word in the XML list for identifying suggested alternatives. To this end, the user interface 44 may contain a pointing device such as a mouse for pointing to a selected item, term, or word in the source string. The alternative items, terms or words are then displayed for selection by a user at the TV set-top box 12. Upon selection by the user of a desired replacement, the processor 40 identifies the selected alternative item, term, or word, replaces the selected alternative in the source string, displays the source string and hides the fault attribute from the selected alternative. This process is repeated as required for further selected items, terms or words in the source string.

Figure 4:
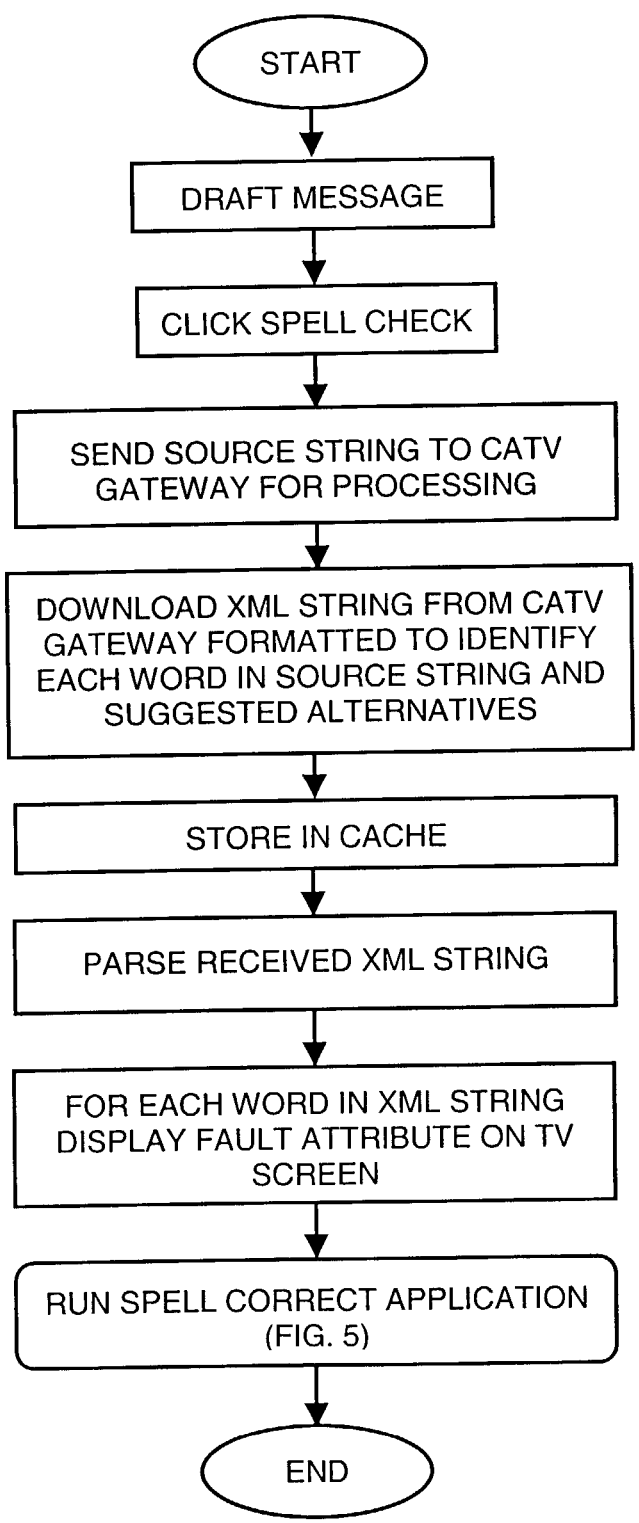
FIG. 4 is a flow diagram showing the principal operations carried out by the TV set-top box in the system of FIG. 1 prior to conveying a message to the CATV gateway.
Figure 5:
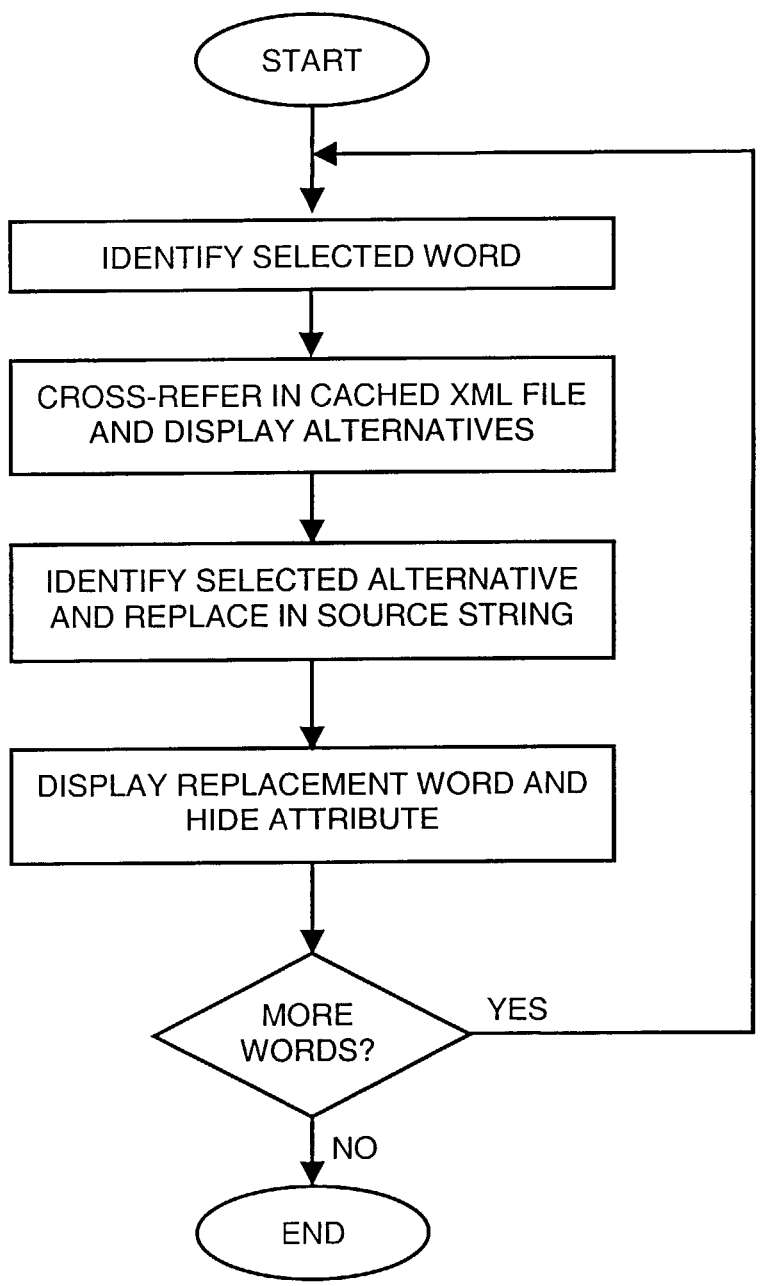
FIG. 5 is a flow diagram showing the principal operations carried out by the TV set-top box in the system of FIG. 1 after receiving replacement data from the CATV gateway.

FIGS. 4 and 5 are flow diagrams showing the principal operations carried out by the TV set-top box 12, upon establishing on-line communication with the CATV gateway 17. The user drafts a message and then selects the application that is required, e.g. spell check, translate etc. Assuming that spell check is selected, the message (constituting the source string) is conveyed to the CATV gateway 17 for processing (as described below with reference to FIG. 6). The XML string formatted by the CATV gateway 17 is then downloaded to the TV set-top box 12 and stored in the memory 41, which serves to cache the XML string. As explained above, the TV set-top box 12 processes the XML string to extract therefrom an identity of an incorrectly spelled word in the source string, and displays the identified word using at least one fault attribute, such as different color or underline etc.

The spell check application, shown in FIG. 5, allows an incorrect word to be selected and cross-referenced in the cached XML file so as to display the alternative words. The incorrect word is then replaced by a selected alternative word and the fault attribute hidden. While an XML file is described as an illustrative example, it will be understood to those skilled in the art that a number of data handling protocols and software, now known or later developed, can be used, so long as they are suitable to carry out the purposes of this invention.

Figure 6:
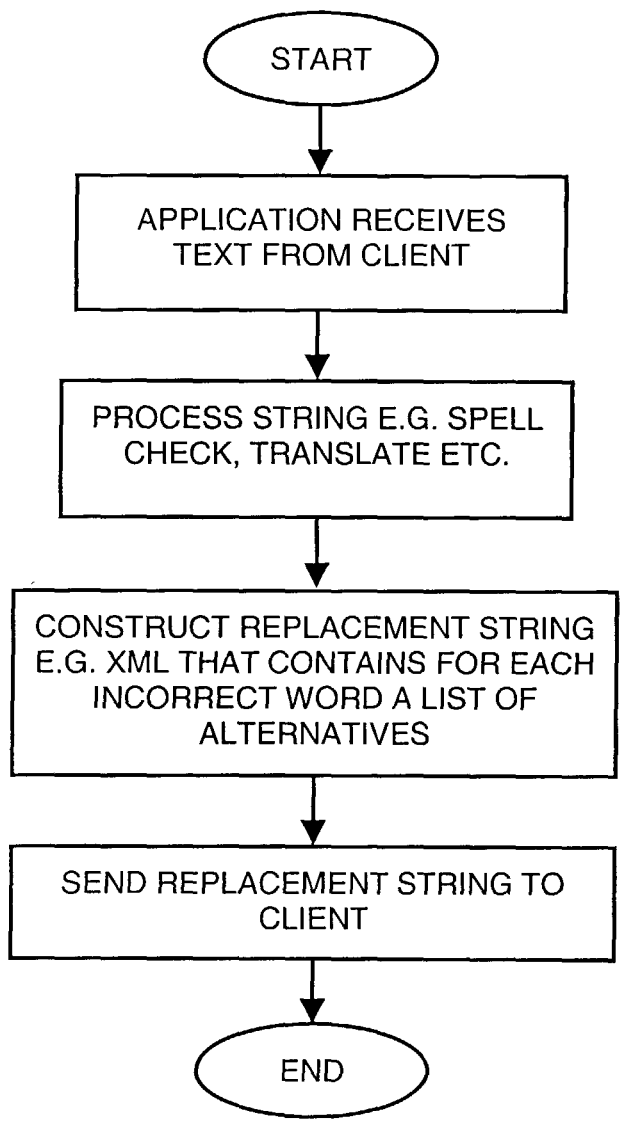
FIG. 6 is a flow diagram showing the principal operations carried out by a CATV gateway in the system of FIG. 1.

FIG. 6 is a flow diagram showing the principal operations carried out by the CATV gateway 17. Thus, the CATV gateway 17 receives and processes an incoming text message according to the application selected by the TV set-top box 12. It then constructs the replacement string and forwards it to the TV set-top box.

It will be understood that although a particular example of a spell check application has been described, the invention contemplates the use of other text processing applications, such as translation and so on. In the case of translation, the replacement string compiled by the CATV gateway 17 is a complete translation of the source string and no further interaction on the part of the TV set-top box 12 may be necessary. Thus, in this case the data sent by the CATV gateway 17 to the TV set-top box 12 is the translated source string and is displayed by the TV set-top box 12 instead of the original message.

It should also be appreciated that while particular applications of spell check and translation have been described with reference to SMS messages conveyed via the CATV infrastructure, the invention is equally applicable for other kinds of text messages conveyed via the TV infrastructure such as Mail-TV, and so on.

It will also be understood that the features of the TV set-top box 12 and of the CATV gateway 17 herein described may be implemented via suitably programmed computers. Further, the TV set-top box is to be broadly understood as any device capable of carrying out the functions associated with a set-top box, including a computer or other device coupled to a television, screen, or other display adapted to convey visual images to a user, and also includes a television that physically incorporates a TV set-top box or the functions of a TV set-top box. Likewise, the invention contemplates computer programs being readable by the processors in the respective units for executing the methods of the invention. The invention further contemplates machine-readable memories tangibly embodying programs of instructions executable by the respective units for executing the methods of the invention.

It will also be appreciated that, while the invention has been described with particular regard to a CATV communication infrastructure, it is equally applicable to a satellite TV communication infrastructure. Thus, within the context of the appended claims, the term "TV communication infrastructure" embraces both a CATV infrastructure and a DBS infrastructure. Likewise, the term "TV communication gateway" embraces both a CATV gateway and a DBS (Direct Broadcasting via Satellite) gateway. In this connection it will be understood that the DBS gateway is accessed via a modem, typically connected to a telephone line in known manner.

In the method claims that follow, alphabetic characters and Roman numerals used to designate claim operations are provided for convenience only and do not imply any particular order of performing the operations.

The invention claimed is:

1. A method of replacing at least one item in a source string input to a TV set-top box, the method comprising:
   (a) receiving the source string from the TV set-top box, via a first communication port that is coupled to the TV set-top box through a TV communication infrastructure;
   (b) for each item that requires replacing, determining at least one replacement item;
   (c) forwarding to the TV set-top box, via the first communication port, data relating to the at least one replacement item;
   (d) receiving, via the first communication port, a message that includes a corrected version of the source string; and
   (e) conveying the message to a destination device through the Internet, via a second communication port that is coupled to the Internet.

2. The method according to claim 1, further including parsing the source string and identifying at least one item that requires replacing.

3. The method according to claim 1,
   wherein the item is a word, and
   wherein the data includes a list of alternative words for selection by a user at the TV set-top box.

4. The method according to claim 3, wherein the list is compiled in XML.

5. The method according to claim 2,
   wherein the item is a word, and
   wherein the parsing includes determining that the at least one word is incorrectly spelled.

6. The method according to claim 2, wherein the parsing includes identifying phrases in the source string and suggesting at least one replacement phrase.

7. The method according to claim 6, wherein the at least one replacement phrase is a translation into a foreign language of a corresponding phrase in the source string.

8. The method according to claim 1,
   wherein the item is a word, and
   wherein the data includes a string of replacement words which together form a translation of the source string into a foreign language.

9. A TV communication gateway including:
   a first communications port that is coupled to a TV set-top box through a TV communication infrastructure;
   a second communication port that is coupled to the Internet;
   a processor configured to:
      (a) receive a source string from the TV set-top box via the first communication port;
      (b) parse the source string, identify at least one term that requires replacing;
      (c) determine at least one replacement term for each term that requires replacing; and
      (d) forward to the TV set-top box, via the first communication port, data relating to the at least one replacement term;
      (e) receive, via the first communication port, a message that includes a corrected version of the source string; and
      (f) convey the message to a destination device through the Internet, via the second communication port.

10. The TV communication gateway according to claim 9,
    wherein the term is a word, and
    wherein the TV communication gateway further includes a translator, coupled to the processor, and configured to translate the source string into a foreign language such that the data includes a string of replacement words which together form a translation of the source string into the foreign language.

11. The TV communication gateway according to claim 9, wherein the term is a word, and
wherein the TV communication gateway further includes a spell checker, coupled to the processor, and configured to determine that a word is incorrectly spelled.

12. The TV communication gateway according to claim 9, wherein the term is a word, and the spell checker is adapted to compile a list of alternative words for selection by a user at the TV set-top box.

13. The TV communication gateway according to claim 12, further including an XML formatter, coupled to the spell checker, and configured to compile the list in XML.

14. A non-transitory machine-readable medium incorporating a program of instructions configured to:
receive a source string from a TV set-top box, via a first communication port that is coupled to the TV set-top box through a TV communication infrastructure;
parse the source string and identify at least one item that requires replacing;
determine at least one replacement item for each item that requires replacing;
forward to the TV set-top box, via the first communication port, data relating to the at least one replacement item;
receive, via the first communication port, a message that includes a corrected version of the source string; and
convey the message to a destination device through the Internet, via a second communication port that is coupled to the Internet.

15. A non-transitory machine-readable medium incorporating a program of instructions item comprising:
means for receiving a source string from a TV set-top box via a first communication port that is coupled to the TV set-top box through a TV communication infrastructure;
means for parsing the source string and identifying at least one item that requires replacing;
means for determining at least one replacement item for each item that requires replacing;
means for reporting to the TV set-top box, via the first communication port, data relating to the at least one replacement item;
means for receiving, via the first communication port, a message that includes a corrected version of the source string; and
means for conveying the message to a destination device through the Internet, via a second communication port that is coupled to the Internet.

16. A non-transitory computer program product comprising a computer useable medium having computer readable program code embodied therein for replacing at least one item in a source string input to a TV set-top box for conveying via a TV communication infrastructure, the computer program product comprising:
computer readable program code for causing the computer to receive the source string from the TV set-top box via a first communication port that is coupled to the TV set-top box through the TV communication infrastructure;
computer readable program code for causing the computer to parse the source string and identify at least one item that requires replacing;
computer readable program code for causing the computer to determine at least one replacement alternative for each item that requires replacing;
computer readable program code for causing the computer to forward to the TV set-top box, via the first communication port, data relating to the at least one replacement alternatives;
computer readable program code for causing the computer to receive, via the first communication port, a message that includes a corrected version of the source string; and
computer readable program code for causing the computer to convey the message to a destination device through the Internet, via a second communication port that is coupled to the Internet.

* * * * *